United States Patent

Vannucci

(10) Patent No.: US 6,256,475 B1
(45) Date of Patent: *Jul. 3, 2001

(54) TELECOMMUNICATIONS-ASSISTED SATELLITE POSITIONING SYSTEM

(75) Inventor: Giovanni Vannucci, Middletown, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/525,969

(22) Filed: Mar. 15, 2000

Related U.S. Application Data

(63) Continuation of application No. 08/927,432, filed on Sep. 11, 1997.

(51) Int. Cl.[7] ........................................ H04Q 7/20
(52) U.S. Cl. ..................... 455/12.1; 342/357.01
(58) Field of Search .................. 455/12.1, 13.1, 455/13.2, 11.1, 13.3, 502, 427, 429, 430, 428; 342/125, 146, 357.01, 353, 352.05, 385, 402, 357.02, 357.03; 375/208, 209, 326, 341, 366, 367; 701/213, 215

(56) References Cited

U.S. PATENT DOCUMENTS

| Re. 35,498 | * | 4/1997 | Barnard ............................ 342/457 |
|---|---|---|---|
| 4,313,183 | | 1/1982 | Saylors . |
| 4,445,118 | | 4/1984 | Taylor et al. . |
| 5,025,457 | | 6/1991 | Ahmed . |
| 5,062,151 | | 10/1991 | Shipley . |
| 5,175,557 | | 12/1992 | King et al. . |
| 5,365,450 | | 11/1994 | Schuchman et al. . |
| 5,365,544 | | 11/1994 | Schilling . |
| 5,394,561 | | 2/1995 | Freeburg . |
| 5,404,376 | | 4/1995 | Dent . |
| 5,422,813 | * | 6/1995 | Schuchman et al. ................ 455/440 |
| 5,444,450 | | 8/1995 | Olds et al. . |
| 5,479,482 | | 12/1995 | Grimes . |
| 5,500,648 | | 3/1996 | Maine et al. . |
| 5,508,708 | | 4/1996 | Ghosh et al. . |
| 5,510,797 | | 4/1996 | Abraham et al. . |
| 5,515,062 | | 5/1996 | Maine et al. . |
| 5,515,419 | | 5/1996 | Sheffer . |
| 5,523,761 | | 6/1996 | Gildea et al. . |
| 5,524,136 | | 6/1996 | Bar-Noy et al. . |
| 5,548,583 | | 8/1996 | Bustamante . |
| 5,559,520 | | 9/1996 | Barzegar et al. . |

(List continued on next page.)

FOREIGN PATENT DOCUMENTS

WO 97/14049   10/1996   (WO) .

*Primary Examiner*—Dwayne Bost
*Assistant Examiner*—Jean A Gelin
(74) *Attorney, Agent, or Firm*—DeMont & Breyer, LLC; Jason Paul DeMont; Wayne S. Breyer

(57) ABSTRACT

A wireless terminal and auxiliary system are disclosed that enable the wireless terminal to determine its location based on signals transmitted from navigation satellites. In particular, the tasks of signal acquisition and signal processing required of a wireless terminal in the prior art are divided between the wireless terminal and the auxiliary system in accordance with the illustrative embodiment. The auxiliary system assists the wireless terminal by acquiring information about the satellites' ephemerides, by partially processing it and by transmitting the partially processed information to the wireless terminal in a form that is useful to the wireless terminal. The wireless terminal then uses the partially processed information from the auxiliary system to assist the wireless terminal in acquiring the ranging signals from the navigation satellites quickly and when they are weak.

46 Claims, 7 Drawing Sheets

U.S. PATENT DOCUMENTS

| | | | |
|---|---|---|---|
| 5,572,216 | * 11/1996 | Weinberg et al. | 455/12.1 |
| 5,574,970 | * 11/1996 | Linquist et al. | 455/13.1 |
| 5,584,046 | * 12/1996 | Martinez et al. | 455/13.1 |
| 5,587,715 | * 12/1996 | Lewis | 455/12.1 |
| 5,604,920 | * 2/1997 | Bertiger et al. | 455/13.1 |
| 5,615,173 | 3/1997 | Brumley et al. . | |
| 5,642,377 | 6/1997 | Chung et al. . | |
| 5,646,630 | * 7/1997 | Sheynblat et al. | 342/357.03 |
| 5,663,734 | 9/1997 | Krasner . | |
| 5,687,116 | 11/1997 | Natali et al. . | |
| 5,689,245 | 11/1997 | Noreen et al. . | |
| 5,739,786 | * 4/1998 | Greenspan et al. | 342/357.1 |
| 5,781,151 | 7/1998 | Stratton . | |
| 5,781,156 | * 7/1998 | Krasner | 342/357.12 |
| 5,790,939 | * 8/1998 | Malcolm et al. | 455/13.2 |
| 5,809,064 | * 9/1998 | Fenton et al. | 375/208 |
| 5,847,678 | 12/1998 | Tachita . | |
| 5,857,155 | * 1/1999 | Hill et al. | 455/440 |
| 5,862,172 | * 1/1999 | Sugita et al. | 375/200 |
| 5,864,579 | * 1/1999 | Briskman | 455/13.1 |
| 5,872,810 | 2/1999 | Philips et al. . | |
| 5,883,596 | * 3/1999 | Rodal | 701/213 |
| 5,893,044 | * 4/1999 | King et al. | 701/214 |
| 5,905,762 | 5/1999 | Stephens . | |
| 5,912,644 | 6/1999 | Wang . | |
| 5,959,577 | * 9/1999 | Fan et al. | 342/357.13 |
| 6,023,489 | * 2/2000 | Hatch | 375/208 |
| 6,101,178 | * 8/2000 | Beal | 370/336 |
| 6,114,991 | * 9/2000 | Richton et al. | 342/357.1 |

* cited by examiner

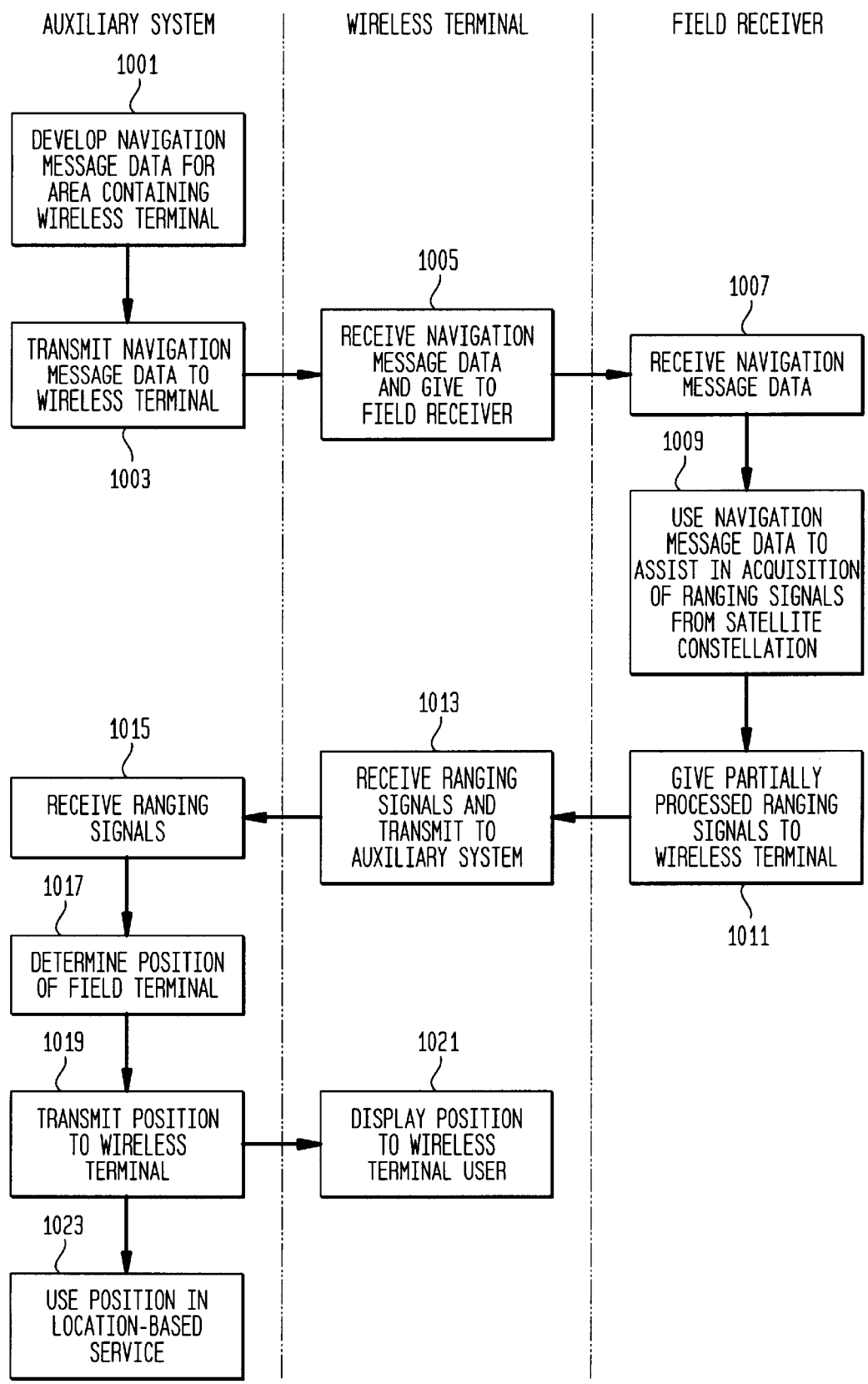

TELECOMMUNICATIONS-ASSISTED SATELLITE POSITIONING SYSTEM

REFERENCE TO RELATED APPLICATIONS

This application is a continuation of U.S. application Ser. No. 08/927,432, filed Sep. 11, 1997, now pending.

FIELD OF THE INVENTION

The present invention relates to a wireless terminal in general, and, more particularly, to a wireless terminal that receives one or more signals from an auxiliary system that assists the wireless terminal in receiving one or more signals from a satellite positioning system.

BACKGROUND OF THE INVENTION

A satellite positioning system, such as the Global Positioning System ("GPS"), comprises a constellation of satellites that transmit signals that can be used by a wireless terminal to determine, in well-known fashion, the wireless terminal's position. Typically, the signals transmitted by each satellite convey three types of information: (1) satellite trajectory data, (2) system timing, and (3) ranging information. When a wireless terminal can acquire the signals from three or more satellites the wireless terminal can determine its position through triangulation, as is well-known in the art. FIG. 1 depicts a schematic diagram of a satellite positioning system in the prior art.

Although a conventional wireless terminal can determine its position with some degree of accuracy, fluctuations in the ionosphere and the atmosphere and jitter in the transmitted signals themselves prevent a conventional wireless terminal from determining its position with a high degree of accuracy. To mitigate the effects of these factors and thus improve the degree of accuracy with which a wireless terminal can ascertain its position, another satellite positioning system, typified by the Differential Global Positioning System ("DGPS"), was developed. FIG. 2 depicts a schematic diagram of a Differential Global Positioning System.

As is well-known in the prior art, DGPS comprises terrestrial reference receiver 205, whose position is static and exactly known through conventional survey techniques, in addition to satellite constellation 203 and wireless terminal 201. The theory underlying DGPS is that when wireless terminal 201 is in close proximity (e.g., within 50 miles) to terrestrial reference receiver 205, both wireless terminal 201 and terrestrial reference receiver 205 are expected to experience the same ionospheric and atmospheric fluctuations and signal jitter. Terrestrial reference receiver 205 uses the signals from satellite constellation 203 to estimate its position, and, using its known exact position, calculates the error between its estimated position and its known exact position. That error or "difference" is a vector that represents the inaccuracy of the estimated position from the ionospheric and atmospheric fluctuations and signal jitter. The difference vector is broadcast by terrestrial reference receiver 205 to wireless terminal 201 in real time. When wireless terminal 201 estimates is position through conventional means, it uses the difference vector received from terrestrial reference receiver 205 to subtract out the effects of the ionospheric and atmospheric fluctuations and signal jitter.

FIG. 3 depicts a schematic diagram of a Tidget® satellite positioning system in the prior art. The wireless receiver in a Tidget system does not compute the position of the wireless terminal. Instead, the wireless receiver in a Tidget system acts like a wireless repeater in that it receives the signals from the satellite constellation and then relays the unprocessed signals to a remote processing facility, which uses the signals to determine the position of the Tidget wireless terminal. An advantage of a Tidget system is that is reduces the cost of the wireless terminal by eliminating from the wireless terminal the expensive circuitry that would otherwise be needed to compute the position of the wireless terminal. When it is more advantageous that a remote facility know the location of the wireless terminal than that the wireless terminal know its own location, a Tidget system is advantageous in that it relays, in effect, the position of the wireless terminal to the remote facility.

FIG. 4 depicts a schematic diagram of a Tendler® satellite positioning system in the prior art. A wireless terminal constructed in accordance with this system comprises both the circuitry needed to determine its position from a satellite constellation and a wireless telephone transmitter to transmit the determined position to another party via a wireless telecommunications system.

Regardless of the advances made in satellite positioning systems, limitations still exist. Typically, the strength of the signals from the satellite constellation is too attenuated in buildings and other shadowed environments for a wireless terminal to receive. Furthermore, a wireless terminal can take several minutes to acquire the signals from the satellites it needs to determine its position.

SUMMARY OF THE INVENTION

Some embodiments of the present invention are capable of determining the position of a wireless terminal while avoiding many of the costs and restrictions associated with systems in the prior art. In particular, some embodiments of the present invention are less expensive than wireless terminals in the prior art. Furthermore, some embodiments of the present invention are able to receive and use weaker signals than wireless terminals in the prior art; and still furthermore, some embodiments of the present invention are capable of determining their location more quickly than wireless terminals in the prior art.

A wireless terminal in accordance with an embodiment of the present invention can exhibit these advantages when the tasks of signal acquisition and signal processing required of a wireless terminal in the prior art are divided between the wireless terminal and an auxiliary system. In particular, the requirements normally imposed on a wireless terminal in the prior art are off-loaded onto an auxiliary system that can provide useful information to the wireless terminal over a wireless telecommunications link.

It is possible to divide the signal acquisition and signal processing tasks between the wireless terminal and the auxiliary system because each signal transmitted by each satellite in a satellite positioning system's constellation carries two distinct kinds of information that are responsive to independent acquisition and independent processing. The two kinds of information are: (1) ranging information, and (2) information about the satellites' ephemerides.

The information about the satellites' ephemerides is the same for all receivers, regardless of their position. In contrast, the ranging information, which indicates to the receiver its distance from each satellite, is location dependent and can be received only by the wireless terminal itself. Therefore, the auxiliary system can assist the wireless terminal by acquiring the information about the satellites' ephemerides, by partially processing it and by transmitting it to the wireless terminal in a form that is useful to the wireless terminal. The auxiliary system cannot, however, acquire the ranging information for the wireless terminal.

By having the auxiliary system acquire the information about the satellites' ephemerides for the wireless terminal, the signal acquisition and signal processing demands of the wireless terminal are reduced. Furthermore, the wireless terminal can actually use the partially processed information from the auxiliary system to assists the wireless terminal in acquiring the ranging signals quickly and when they are weak.

When the wireless terminal is capable of providing the functionality of a wireless telecommunications terminal (e.g., a cellular telephone, a hand-held data entry device, etc.), the circuitry for determining the wireless terminal's location, in accordance with some embodiments of the present invention, can be added to the wireless terminal for moderately little cost.

BRIEF DESCRIPTION OF THE DRAWINGS

FIG. 10 is a flowchart of the operation of the auxiliary system and wireless terminal shown in FIG. 5 in accordance with another embodiment of the present invention.

DETAILED DESCRIPTION

Figure 1:
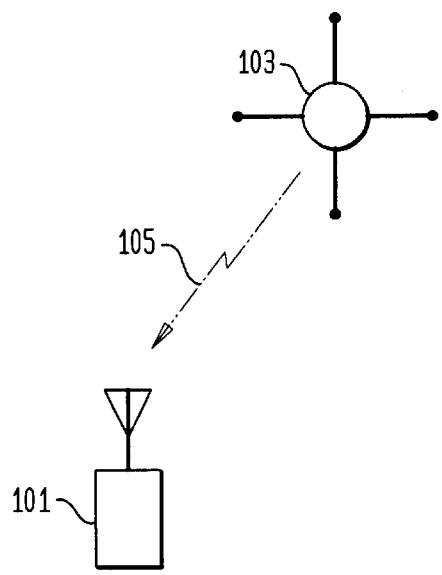
FIG. 1 is a block diagram of a satellite positioning system, such as GPS, in the prior art.
Figure 2:
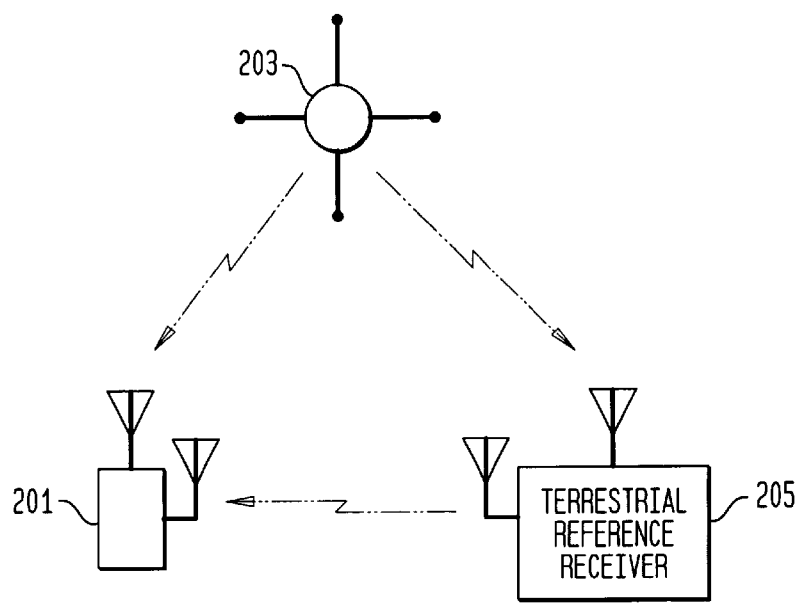
FIG. 2 is a block diagram of a differential GPS system in the prior art.
Figure 3:
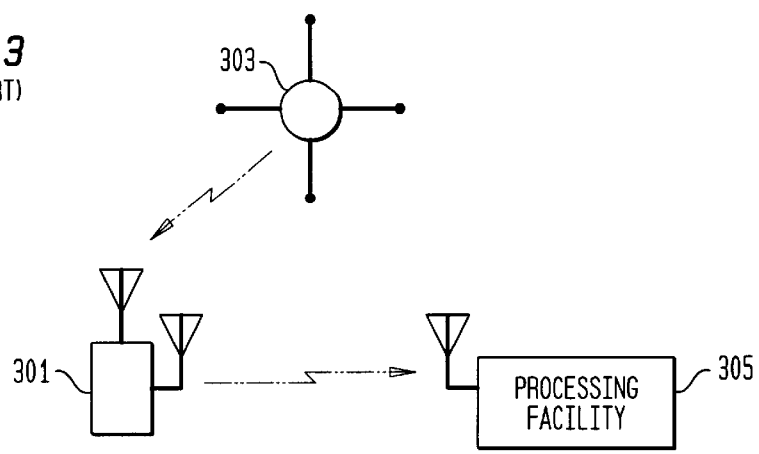
FIG. 3 is a block diagram a Tidget-like system in the prior art.
Figure 4:
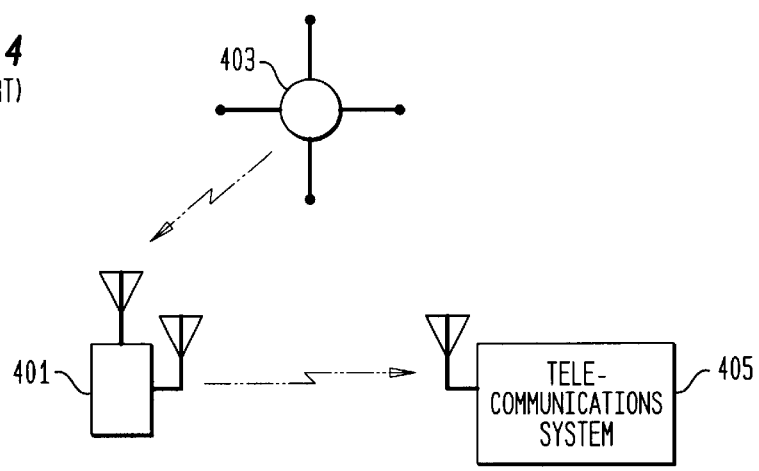
FIG. 4 is a block diagram of a Tendler-like system in the prior art.
Figure 5:
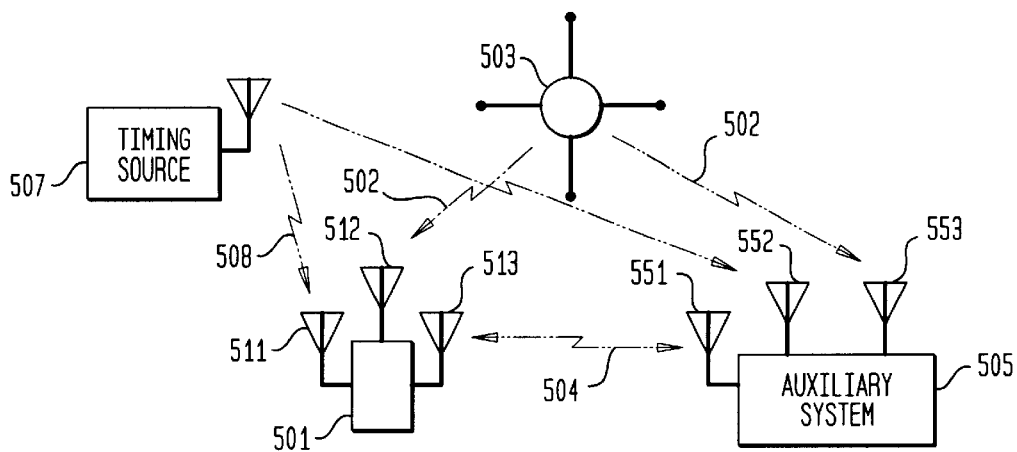
FIG. 5 is a block diagram of a satellite positioning system in accordance with the illustrative embodiment of the present invention.

FIG. 5 depicts a drawing of a satellite positioning system in accordance with an illustrative embodiment of the present invention. The satellite positioning system depicted comprises wireless terminal 501, satellite constellation 503, auxiliary system 505 and timing source 507. Satellite constellation 503 is the Global Positioning System as is well-known in the art and will not be further discussed. It will be clear to those skilled in the art how to make and use embodiments of the present invention that work with other satellite constellations.

The principal goal of the illustrative embodiment is to reduce the signal acquisition and signal processing requirements of a conventional wireless terminal so that a wireless terminal in accordance with the illustrative embodiment can determine its location more quickly and with weaker signals than wireless terminals in the prior art. In accordance with the illustrative embodiment, the signal acquisition and signal processing requirements of wireless terminal 501 are reduced at the expense of auxiliary system 505. In particular, the tasks of signal acquisition and signal processing required for a conventional wireless terminal to determine its position are divided between wireless terminal 501 and auxiliary system 505.

It will be clear to those skilled in the art how the signal processing task can be divided between wireless terminal 501 and auxiliary system 505, as partially processed signal information can be exchanged back and forth between the two through wireless telecommunications link 504 as needed to achieve desirable division of the signal processing task.

It is possible to divide the signal processing task between wireless terminal 501 and auxiliary system 505 because each signal transmitted by each satellite in satellite constellation 503 carries two distinct kinds of information that are responsive to independent acquisition and independent processing. The two kinds of information are: (1) ranging information, and (2) information about the satellites' ephemerides. More specifically, the GPS signal is modulated with digital information in a manner similar to how, for example, a cellular telephone's radio signal is modulated with voice data. Such information can be detected and demodulated by any receiver adapted to do so. The information reconstructed by the receiver is an exact replica of the information modulated onto the signal by the transmitter (except for unwanted errors due to noise, distortion, etc.) and is the same for all receivers, regardless of their position. This information shall be referred to as "information about the satellites' ephemerides."

In contrast, in a location system there is also important information in the precise timing of the signal. The transmitter carefully adjusts the timing of the transmitted signal according to some precise reference, such that the timing of the signal, as received by the receiver carries information about the distance between the transmitter and the receiver (and, therefore, about the receiver's position). Such information will be different from receiver to receiver, and is only available at the receiver itself This information shall be referred to as "ranging information."

For example, since each satellite in constellation 503 transmits a signal 502 that contains both kinds of information to both wireless terminal 501 and auxiliary system 505, some or all of the information about the satellites' ephemerides is acquired by auxiliary system 505 through antenna 553, even though the ranging information acquired by auxiliary system 505 is relevant to the position of auxiliary system antenna 553 and not to the position of wireless terminal 501. However, auxiliary system 505 has approximate knowledge of the position of wireless terminal 501 (for example, through knowledge of the cell and sector where a mobile is located); therefore, auxiliary system 505 combines this knowledge with the acquired ranging information and with the satellites' ephemerides information to compute an estimate of the ranging information at the position of wireless terminal 501. This estimate, together with the satellites' emphemerides information, is transmitted, via wireless telecommunications antenna 551, to wireless terminal 501 to assist wireless terminal 501 in acquiring and processing ranging information.

Once the ranging information has been acquired by wireless terminal 501, wireless terminal 501 can use the satellite ephemeris information and ranging information to determine its location, or wireless terminal 501 can transmit the ranging information back to auxiliary system 505 so that auxiliary system 505 can determine the location of wireless terminal 501.

Because wireless terminal 501 is freed from the task of acquiring some or all of the information about the satellites' ephemerides and is advantageously provided with an estimate of the ranging information, it can be fabricated from less expensive technology that need only perform the easier task of acquiring and processing the ranging information with a priori knowledge of an estimated form of that information. Furthermore, because the satellite ephemerides information is modulated onto the same carrier as the ranging information, the provision of the satellites' ephemerides information to wireless terminal 501 enables wireless terminal 501 to remove the satellites' ephemerides information from the satellite signal received through antenna 512 and, thereby, acquire the ranging information even under faded conditions of low signal-to-noise ratio that are inadequate for the operation of a wireless terminal in prior art.

Auxiliary system 505 can be a terrestrial facility, an airborne facility or an artificial satellite in orbit around the earth. Unlike a Differential Global Positioning System's terrestrial reference receiver, however, the position of auxiliary system 505 need not remain static nor need its exact location be known.

Figure 6:
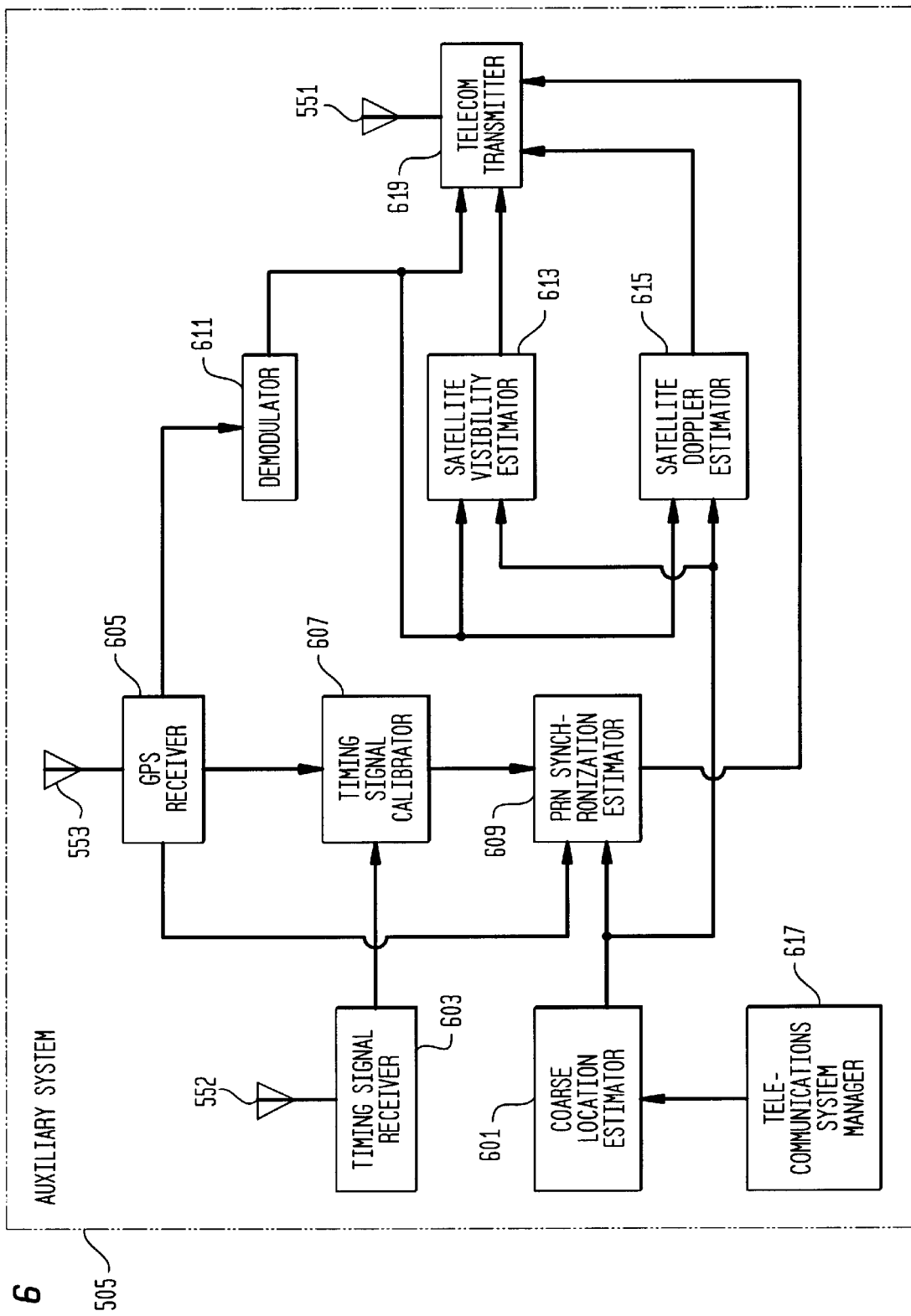
FIG. 6 is a block diagram of the auxiliary system shown in FIG. 5.

FIG. 6 depicts a block diagram of the salient components of auxiliary system 505, which comprises: timing signal receiver 603, timing signal antenna 552, coarse location estimator 601, telecommunications system manager 617, GPS receiver 605, GPS receiver antenna 553, timing signal calibrator 607, PRN synchronization estimator 609, demodulator 611, satellite visibility estimator 613, satellite Doppler estimator 615, telecommunications transmitter 619 and telecommunications antenna 551.

In general, auxiliary system 505 uses its GPS receiver to obtain from each satellite above the horizon both ranging information and information about the satellite's ephemeris, in well-known fashion using the C/A or Coarse Acquisition code. It will be clear to those skilled in the art how to make and use embodiments of the present invention that use the P(Y) or P code. In the process of obtaining the ranging and satellite ephemeris information, auxiliary system 505 learns, among other things: (1) the pseudo-random number (hereinafter "PRN") synchronization from each satellite (i.e., the exact timing of the PRN code transmitted by each satellite), (2) the Doppler shift associated with each satellite, (3) which satellites are above the horizon, and (4) the 50 bps modulated bit stream from each satellite. Auxiliary system 505 then transmits to wireless terminal 501, via a wireless telecommunications channel, for each satellite above the horizon: (1) an estimate of the PRN synchronization, (2) an estimate of the Doppler shift, and (3) the 50 bps modulated bit stream. Collectively, this information will be called "Navigation Message Data."

When auxiliary system 505 is part of a wireless telecommunications system that partitions a geographic area into a number of tessellated areas called "cells," auxiliary system 505 knows which cell wireless terminal 501 is in and, therefore, its rough location to within a few miles. When auxiliary system 505 has a rough idea (e.g., within a few miles) of the position of wireless terminal 501, auxiliary system 505 can accurately estimate the PRN synchronization and Doppler shift as seen by wireless terminal 501.

Because the PRN synchronization estimate, the Doppler shift estimate and the 50 bps modulated bit stream are perishable and only useful when wireless terminal 501 and auxiliary system 505 are synchronized within a few GPS C/A code chips, both wireless terminal 501 and auxiliary system 505 are advantageously synchronized to within 1 $\mu$s. To accomplish this, both wireless terminal 501 and auxiliary system 505 can receive a timing synchronization signal from independent timing source 507, in well-known fashion. Alternatively, auxiliary system 505 can contain a timing source and can transmit a synchronization signal to wireless terminal 501 over the telecommunications channel.

For example, when auxiliary system 505 is part of a CDMA wireless telecommunications system and wireless terminal 501 is CDMA compliant, both auxiliary system 505 and wireless terminal 501 will be synchronized to within 1 $\mu$s and timing source 507 is not needed. It will be clear to those skilled in the art how to provide synchronization for wireless terminal 501 and auxiliary system 505.

Returning to FIG. 6, when auxiliary system 505 is part of an IS-95 CDMA telecommunications system, telecommunications system manager 617 informs coarse location estimator 601 of the cell in which wireless terminal 501 is located. Furthermore, telecommunications system manager 617 can instigate the process of locating wireless terminal 501 when, for example, wireless terminal 501 is carried by a lost child. As another example, a "911" emergency-services call from wireless terminal 501 can provoke telecommunications system manager 617 to locate wireless terminal 501 and direct emergency service personnel to the location of wireless terminal 501. Another position-based service could enable a person whose car had broken down to enter a code, such as *TOW, into wireless terminal 501. Wireless terminal 501 would then relay *TOW to telecommunications system manager 617, which would then ascertain the position of wireless terminal 501 and establish a call between wireless terminal 501 and the towing service that was closest to wireless terminal 501. The disclosure of pending U.S. patent application Ser. No. 08/784108, filed Jan. 15, 1997, entitled "Wireless Location Messaging," is incorporated by reference.

Coarse location estimator 601 uses the information from telecommunications system manager 617 to produce an estimate of the latitude and longitude of the location of wireless terminal 501, which estimate could simply be the location of the center of the cell or sector containing wireless terminal 501.

Timing signal receiver 603 receives the same timing signal from timing source 507 that is received by wireless terminal 501, when timing source 507 is needed for synchronization. The locations of timing signal receiver 603 and timing source 507 must be known with sufficient accuracy to allow timing signal calibrator 607 to accurately determine the timing signal delay between timing source 507 and timing signal receiver 603, as well as the timing signal delay between timing source 507 and wireless terminal 501. For example, the required timing accuracy could be 1 $\mu$sec, based on the coarse estimate of the location of wireless terminal 501. Alternatively, timing signal receiver 603 could receive the timing signal from GPS constellation 503.

GPS receiver 605 receives a signal, via GPS receiver antenna 553, from each satellite in satellite constellation 503 above the horizon and determines each signal's exact time of arrival (i.e., its PRN synchronization). Demodulator 611 demodulates each acquired signal to recover its 50 bps modulated bit stream. PRN synchronization estimator 609 predicts the exact time of arrival of each C/A code signal from each visible satellite at wireless terminal 501 and uses these predictions to estimate the PRN sequence timing to be used by the field receiver in wireless terminal 501 for proper de-spreading of the respective C/A code signals. It should be understood that although PRN synchronization estimator 609 cannot determine the exact PRN sequence timing at wireless terminal 501, a good estimate (e.g., one that is correct within 10 or 20 chips) substantially reduces the number of trial PRN synchronizations that wireless terminal 501 would otherwise have to try.

Satellite visibility estimator 613 extracts the satellite ephemeris from the received modulation bit streams and estimates which satellites are visible to wireless terminal 501 at its location. Similarly, satellite Doppler estimator 615 extracts satellite ephemeris information from the received modulation bit streams and estimates which satellites are visible to wireless terminal 501 at its location. Telecommunications transmitter 619 takes the satellite visibility estimate, the PRN synchronization estimate for each satellite, the Doppler shift estimate for each satellite and the 50 bps modulated bitstream for each satellite and transmits to wireless terminal 501 over a telecommunications channel for each satellite above the horizon: (1) an estimate of the PRN synchronization, (2) an estimate of the Doppler shift, and (3) the 50 bps modulated bit stream. It will be clear to those skilled in the art how to make and use auxiliary system 505.

Figure 7:
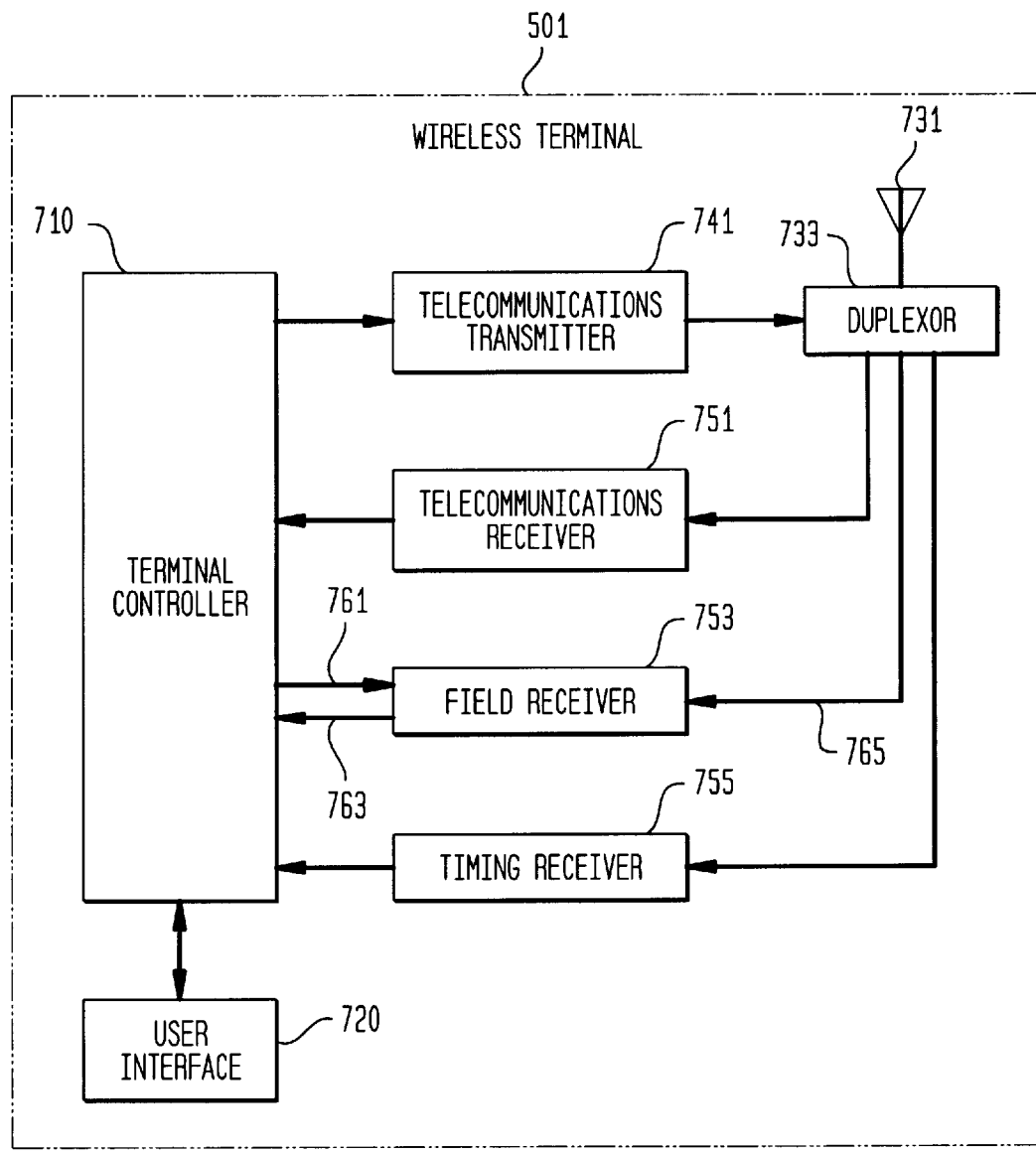
FIG. 7 is a block diagram of the wireless terminal shown in FIG. 5.

FIG. 7 depicts a block diagram of the major components of wireless terminal 501, which comprises: terminal controller 710, user interface 720, telecommunications transmitter 741, telecommunications receiver 751, field receiver 753, timing receiver 755, duplexor 733 and antenna 731, interconnected as shown.

Advantageously, but not necessarily, wireless terminal 501 is capable of performing all of the functionality associated with a typical wireless terminal (e.g., a cellular telephone,). In particular a user of wireless terminal is advantageously capable of having a two-way voice conversation through telecommunications transmitter 741, telecommunications receiver 751 and auxiliary system 505.

Because the Navigation Message Data is transmitted to wireless terminal 501 from auxiliary system 505, the Navigation Message Data is received by wireless terminal 501 via telecommunications receiver 75 1. Telecommunications receiver 751 passes the Navigation Message Data to terminal controller 710, which, in turn, passes the Navigation Message Data to field receiver 753.

As discussed above, wireless terminal 501 also advantageously receives system timing for synchronization purposes. When the timing signal is transmitted from timing source 507, the timing signal is received by wireless terminal 501 via timing receiver 755. Timing receiver 755 passes the timing signal to terminal controller 710 which, in turn, passes the timing signal to field receiver 753. Alternatively, when the timing signal is transmitted from auxiliary system 505, (as is the case when wireless terminal 501 and auxiliary system 505 are part of a CDMA telecommunications system) the timing signal is received by telecommunications receiver 741. Telecommunications receiver 741 then passes the timing signal to terminal controller 710 which, in turn, passes the timing signal to field receiver 753.

In either case, field receiver 753 receives the timing information that it needs without needing to derive it from satellite constellation 503. Furthermore, field receiver 753 also receives for each satellite above the horizon: (1) an estimate of the PRN synchronization, (2) an estimate of the Doppler shift, and (3) the 50 bps modulated bit stream, again without having received any of this information directly from satellite constellation 503.

Wireless terminal 501 also advantageously receives the direct sequence spread spectrum C/A code signals from satellite constellation 503 via field receiver 753.

Figure 8:
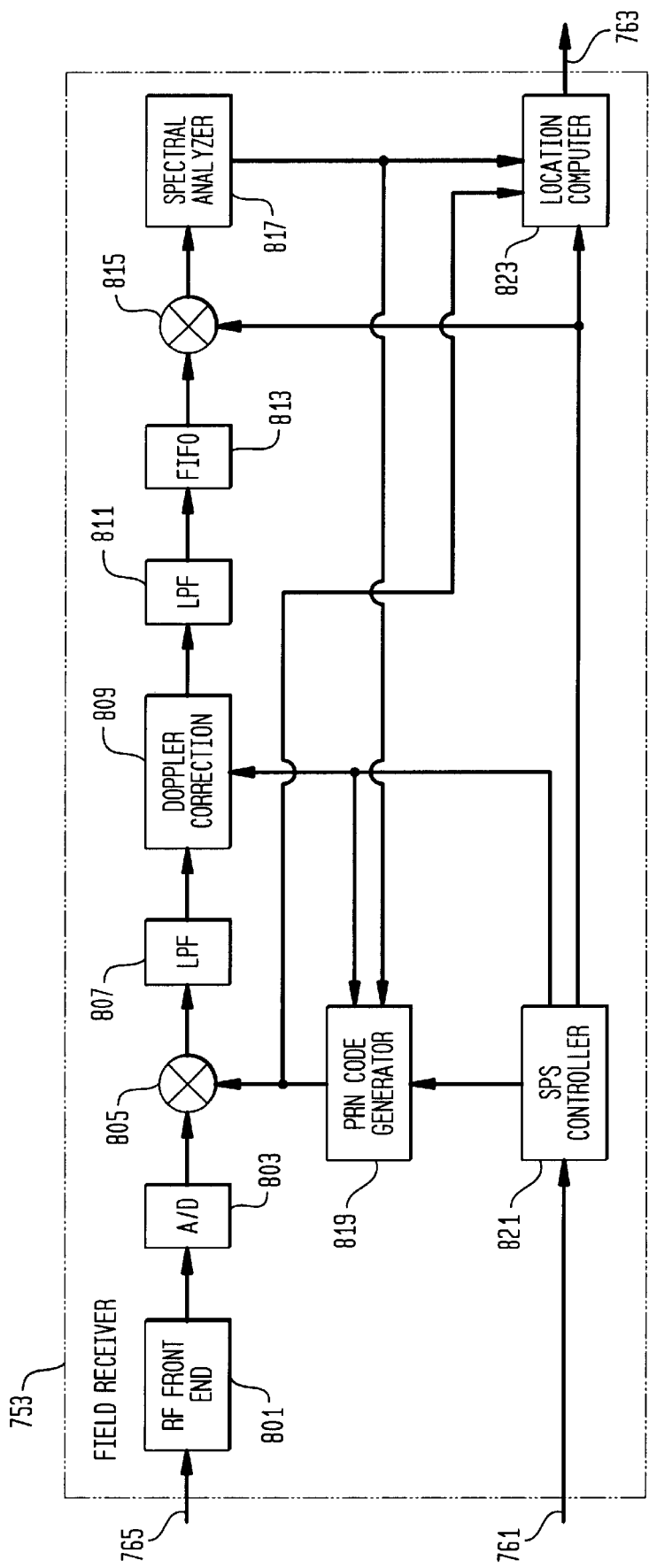
FIG. 8 is a block diagram of the field receiver shown in FIG. 7.

FIG. 8 depicts a block diagram of the major components of field receiver 753 that process the C/A code signal from one satellite in satellite constellation 503. For pedagogical reasons, the functions of field receiver 753 are depicted in FIG. 8 as separate functional blocks that operate on one C/A code signal. It will be clear to those skilled in the art that in many embodiments of the present invention field receiver 753 will be an appropriately programmed general-purpose microprocessor or digital signal processor that simultaneously operates on C/A code signals from multiple satellites. It will also be clear to those skilled in the art that many of the functional blocks in FIG. 8 can be substituted for by transform techniques.

In FIG. 8, SPS controller 821 advantageously receives the Navigation Message Data and timing synchronization information from lead 761 and outputs: (1) the PRN synchronization estimate to PRN code generator 819, (2) the Doppler shift estimate to Doppler correction 809, and the 50 bps modulation bit stream to mixer 815 and location computer 823, all appropriately synchronized. RF front end 801 receives the C/A code signal from a satellite, filters out everything other than the band of interest and mixes it down to IF in well known fashion. A/D converter 803 takes the mixed-down signal and samples it at twice the chipping rate of 1.023 MChips/sec. or more. PRN code generator 819 begins generating the PRN code sequence at 1.023 MChips/sec., which PRN code sequence has a period of 1023 chips, as is well-known in the art. PRN code generator 819 can also use the Doppler shift estimate to correct the PRN code sequence chip rate for Doppler shift, but, because the Doppler shift on the PRN code sequence is usually very small, this need not always be done. It will be clear to those skilled in the art when PRN code generator 819 can neglect correcting for Doppler shift and when it can not.

It will be understood by those skilled in the art how the signal processing functions performed by the blocks that follow A/D converter 803 in FIG. 8 can also be performed in alternative embodiments using analog techniques. In such embodiments, field receiver 753 will be described by a block diagram similar to the one of FIG. 8 except that A/D converter 803 will appear at a different point in the functional sequence of blocks.

It should be understood that no guarantee is needed that the PRN synchronization estimate be correct or that the first PRN code sequence from PRN code generator 819 be synchronized exactly. If it turns out that the PRN code sequence from PRN code generator 819 is not synchronized (as is determined by spectral analyzer 817), the PRN code generator 819 will use the PRN synchronization estimate as an educated guess at finding the true synchronization through a progressive search of synchronization positions near the estimate, in well-known fashion.

Mixer 805 multiplies the PRN code sequence and the digitized C/A code signal and outputs the despread C/A code to lowpass filter 807. Lowpass filter 807 advantageously reduces the bandwidth of the signal so that it can be sampled at a lower rate. This allows Doppler correction block 809 to ignore all but one out of every several samples it receives from lowpass filter 807, so that the resulting number of samples per second is at least the Nyquist rate needed for accurate representation of the output of lowpass filter 807, or twice the bandwidth occupied by the output of lowpass filter 807. Advantageously, the bandwidth is equal to the largest Doppler shift observable in the signal (caused by the relative motion of the satellite with respect to wireless terminal 501) increased by the bandwidth occupied by the 50-bps signal itself. For example, the bandwidth occupied by the output of Lowpass filter 807 can be 8 kHz, corresponding to a Nyquist rate of 16 kilosamples/s).

The Doppler shift caused by the relative motion of the satellite with respect to wireless terminal 501 is comprised of two components: a Doppler shift caused by the relative motion of the satellite with respect to ground (for which an estimate is included in the navigation message data) and a Doppler shift caused by the relative motion, if any, of wireless terminal 501 with respect to ground. Doppler correction 809 takes the signal from lowpass filter 807 and corrects for the estimated Doppler shift due to the relative motion of the satellite with respect to ground. This can be accomplished, in well-known fashion, through, for example, frequency conversion techniques where the frequency of a local oscillator is adjusted to achieve the desired correction.

The output of Doppler correction 809 is fed into lowpass filter 811 which advantageously further reduces the bandwidth of the signal so that it can be sampled at a yet lower rate. Again, FIFO 813 can ignore all but one out of every several samples it receives from lowpass filter 811. The samples that are not ignored must occur at a rate that is at least a Nyquist rate equal to twice the bandwidth occupied by the output of lowpass filter 811. Advantageously, the bandwidth is equal to the largest Doppler shift caused by the relative motion of wireless terminal 501 with respect to ground increased by the bandwidth occupied by the 50-bps signal itself. For example, the bandwidth occupied by the output of lowpass filter 811 can be 500 Hz, corresponding to a Nyquist rate of 1 kilosamples/s).

The output of lowpass filter 811 is fed into FIFO memory 813, which delays the signal for only so long as it takes auxiliary system 505 to recover the 50 bps modulated bit stream and forward it to SPS controller 821. Typically, FIFO memory 813 need only delay the signal for, at most, a few seconds. The output of FIFO memory 813 is fed into mixer 815 to be mixed with the carefully synchronized 50 bps modulated bit stream. The mixing operation will further de-spread the signal by removing the 50-bps modulation. As a result, the output of mixer 815 will be the unmodulated signal carrier, if a signal is present (i.e., if the PRN synchronization is correct).

The output of mixer 813 is fed into spectral analyzer 817, which performs, for example, a discrete fourier transform in well-known fashion. When the output of mixer 813 is a pure sinusoid (which is indicated by a spectral spike out of spectral analyzer 817), it means that PRN code generator 819 is perfectly in sync with the C/A code signal from the satellite. When the output of mixer 813 is other than a pure sinusoid (which is indicated by something other than a spectral spike out of spectral analyzer 817), it means that PRN code generator 819 is not in sync with the C/A code signal and must try another synchronization. It will be clear to those skilled in the art how to perform the spectral analysis through techniques different than those described here, however, that yield the same result, which is detecting the presence or absence of a narrowband component in the output of mixer 815.

Importantly, when PRN code generator is in sync with the C/A code signal from the satellite, it means that location computer 823 can compute the ranging information (i.e., how long did it take the signal to travel from the satellite to wireless terminal 501). And because location computer 823 knows: (1) the PRN code synchronization from PRN code generator 819, (2) the modulated bit stream from SPS controller 821 and (3) when the PRN code is synchronized from spectral analyzer 817, location computer 823 can compute the location of wireless terminal 501, in well-known fashion.

The location of wireless terminal 501 can then be output from location computer 823 to terminal controller 710 and to telecommunications transmitter 741 for transmission back to auxiliary system 505 over a telecommunications channel. Auxiliary system 505 can then use the location of wireless terminal 501 in any number of location-based services.

Figure 9:
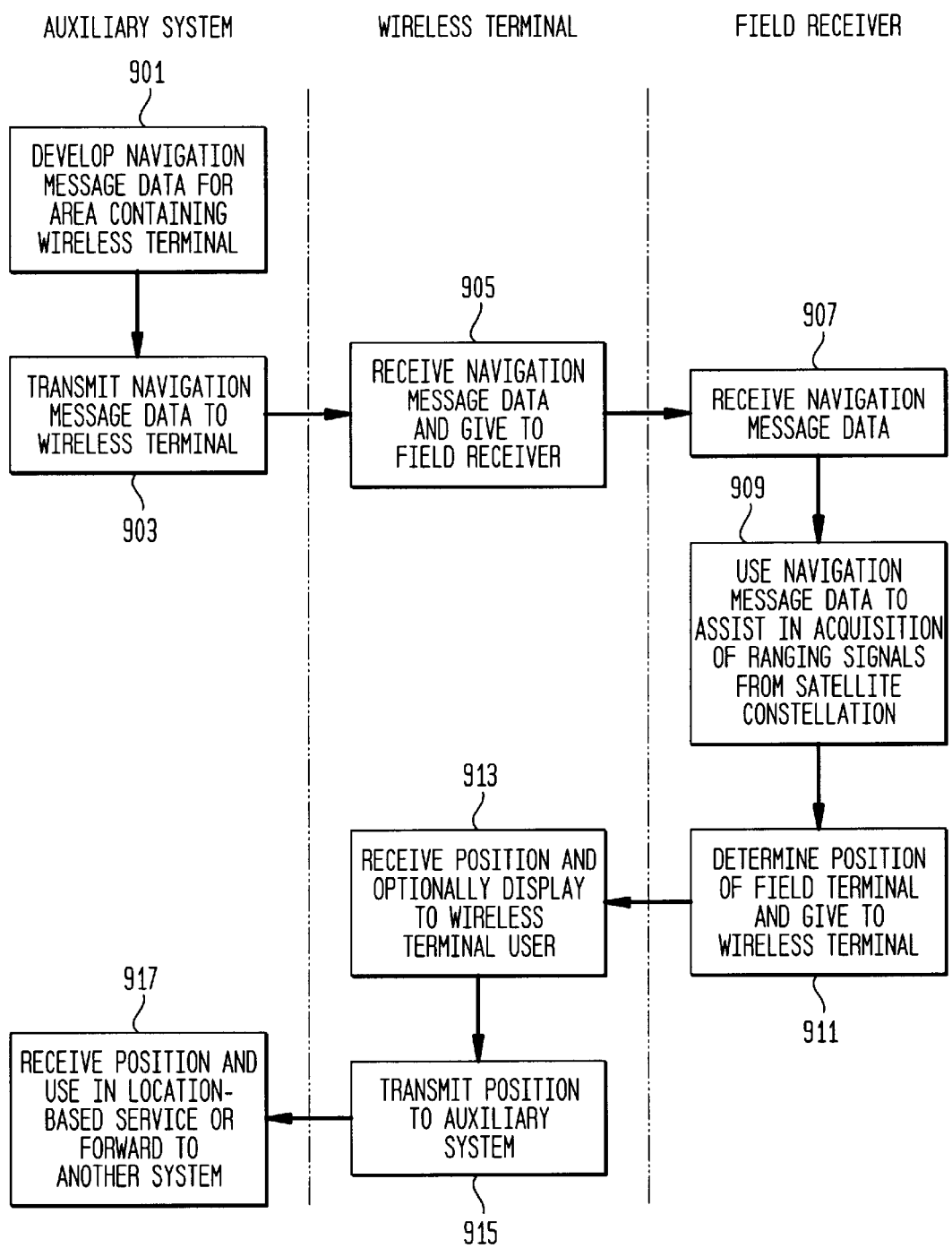
FIG. 9 is a flowchart of the operation of the auxiliary system and wireless terminal shown in FIG. 5 in accordance with one embodiment of the present invention.

FIG. 9 is a flowchart of the operation of the auxiliary system and wireless terminal shown in FIG. 5 in accordance with one embodiment of the present invention.

FIG. 10 is a flowchart of the operation of the auxiliary system and wireless terminal shown in FIG. 5 in accordance with another embodiment of the present invention.

What is claimed is:

1. A wireless terminal comprising:
    a telecommunications receiver for receiving a code synchronization estimate for a ranging signal from a satellite from an auxiliary system over a wireless telecommunications link; and
    a field receiver for receiving and processing said ranging signal using said code synchronization estimate.

2. The wireless terminal of claim 1 wherein said telecommunications receiver also receives a Doppler shift estimate for said ranging signal from said auxiliary system, and wherein said field receiver uses said Doppler shift estimate in processing said ranging signal.

3. The wireless terminal of claim 1 wherein said telecommunications receiver also receives a modulation bit sequence for said ranging signal from said auxiliary system, and wherein said field receiver uses said modulation bit sequence in processing said ranging signal.

4. The wireless terminal of claim 1 wherein said telecommunications receiver also receives a system timing signal from said auxiliary system, and wherein said field receiver uses said system timing signal in processing said ranging signal.

5. The wireless terminal of claim 1 wherein said telecommunications receiver also receives a system timing signal from an independent timing source, and wherein said field receiver uses said system timing signal in processing said ranging signal.

6. The wireless terminal of claim 1 wherein said wireless terminal uses said code synchronization estimate and said ranging signal to determine a position of said wireless terminal.

7. The wireless terminal of claim 6 further comprising a telecommunications transmitter for transmitting said position of said wireless terminal to said auxiliary system.

8. The wireless terminal of claim 6 further comprising a visual display for conveying said position of said wireless terminal to a user of said wireless terminal.

9. The wireless terminal of claim 1 wherein said wireless terminal creates a partially processed ranging signal based on said synchronization estimate and said ranging signal; and further comprising a telecommunications transmitter for transmitting said partially processed ranging signal to said auxiliary system.

10. The wireless terminal of claim 1 wherein said wireless terminal creates a ranging estimate based on said synchronization estimate and said ranging signal; and further comprising a telecommunications transmitter for transmitting said ranging estimate to said auxiliary system.

11. The wireless terminal of claim 1 wherein said field receiver uses:
    said code synchronization estimate to facilitate the creation of a candidate code;

said candidate code and said ranging signal to create a candidate sinusoidal signal; and further comprising a discrete fourier transform of said candidate sinusoidal signal for determining when said candidate code is synchronized with said ranging signal.

12. A wireless terminal comprising:

a telecommunications receiver for receiving a modulation bit sequence for a ranging signal from a satellite from an auxiliary system over a wireless telecommunications link; and a field receiver for receiving and processing said ranging signal using said modulation bit sequence.

13. The wireless terminal of claim 12 wherein said telecommunications receiver also receives a Doppler shift estimate for said ranging signal from said auxiliary system, and wherein said field receiver uses said Doppler shift estimate in processing said ranging signal.

14. The wireless terminal of claim 12 wherein said telecommunications receiver also receives a code synchronization estimate for said ranging signal from said auxiliary system, and wherein said field receiver uses said code synchronization estimate in processing said ranging signal.

15. The wireless terminal of claim 12 wherein said telecommunications receiver also receives a system timing signal from said auxiliary system, and wherein said field receiver uses said system timing signal in processing said ranging signal.

16. The wireless terminal of claim 12 wherein said telecommunications receiver also receives a system timing signal from an independent timing source, and wherein said field receiver uses said system timing signal in processing said ranging signal.

17. The wireless terminal of claim 12 wherein said wireless terminal uses said modulation bit sequence and said ranging signal to determine a position of said wireless terminal.

18. The wireless terminal of claim 17 further comprising a telecommunications transmitter for transmitting said position of said wireless terminal to said auxiliary system.

19. The wireless terminal of claim 17 further comprising a visual display for conveying said position of said wireless terminal to a user of said wireless terminal.

20. The wireless terminal of claim 12 wherein said wireless terminal creates a partially processed ranging signal based on said modulation bit sequence and said ranging signal; and further comprising a telecommunications transmitter for transmitting said partially processed ranging signal to said auxiliary system.

21. The wireless terminal of claim 12 wherein said wireless terminal creates a ranging estimate based on said modulation bit sequence and said ranging signal; and further comprising a telecommunications transmitter for transmitting said ranging estimate to said auxiliary system.

22. The wireless terminal of claim 12 wherein said field receiver uses:

a candidate code, said modulation bit sequence, and said ranging signal to create a candidate sinusoidal signal; and further comprising a discrete fourier transform of said candidate sinusoidal signal for determining when said candidate code is synchronized with said ranging signal.

23. A method of operating a wireless terminal, said method comprising:

receiving a ranging signal from a satellite;

receiving a code synchronization estimate for said ranging signal from an auxiliary system; and processing said ranging signal using said code synchronization estimate.

24. The method of claim 23 further comprising:

receiving a modulation bit sequence for said ranging signal from said auxiliary system; and processing said ranging signal using said modulation bit sequence.

25. The method of claim 23 further comprising:

receiving a Doppler shift estimate for said ranging signal from said auxiliary system; and processing said ranging signal using said Doppler shift estimate.

26. The method of claim 23 further comprising:

receiving from a system timing signal; and processing said ranging signal using said system timing signal.

27. The method of claim 26 wherein said system timing signal is received from said auxiliary system.

28. The method of claim 26 wherein said system timing signal is received from an independent timing source.

29. The method of claim 23 further comprising determining a position of said wireless terminal based on said code synchronization estimate and said ranging signal.

30. The method of claim 29 further comprising transmitting said position of said wireless terminal to said auxiliary system.

31. The method of claim 29 further comprising visually displaying a position of said wireless terminal to a user of said wireless terminal.

32. The method of claim 23 further comprising:

creating a partially processed ranging signal based on said code synchronization estimate and said ranging signal; and transmitting said partially processed ranging signal to said auxiliary system.

33. The method of claim 23 further comprising:

creating a ranging estimate based on said code synchronization estimate and said ranging signal; and transmitting said ranging estimate to said auxiliary system.

34. The method of claim 23 further comprising:

creating a candidate code based on said code synchronization estimate;

creating a candidate sinusoidal signal based on said ranging signal and said candidate code; and performing spectral analysis on said candidate sinusoidal signal to determine when said candidate code is synchronized with said ranging signal.

35. A method of operating a wireless terminal, said method comprising:

receiving a ranging signal from a satellite;

receiving a modulation bit sequence for said ranging signal from said auxiliary system; and processing said ranging signal using said modulation bit sequence.

36. The method of claim 35 further comprising:

receiving a code synchronization estimate for said ranging signal from an auxiliary system; and processing said ranging signal using said code synchronization estimate.

37. The method of claim 35 further comprising:

receiving a Doppler shift estimate for said ranging signal from said auxiliary system; and processing said ranging signal using said Doppler shift estimate.

38. The method of claim 35 further comprising:

receiving from a system timing signal; and processing said ranging signal using said system timing signal.

39. The method of claim 38 wherein said system timing signal is received from said auxiliary system.

40. The method of claim 38 wherein said system timing signal is received from an independent timing source.

41. The method of claim 35 further comprising determining a position of said wireless terminal based on said modulation bit sequence and said ranging signal.

42. The method of claim 41 further comprising transmitting said position of said wireless terminal to said auxiliary system.

43. The method of claim 41 further comprising visually displaying a position of said wireless terminal to a user of said wireless terminal.

44. The method of claim 35 further comprising:

creating a partially processed ranging signal based on said modulation bit sequence and said ranging signal; and transmitting said partially processed ranging signal to said auxiliary system.

45. The method of claim 35 further comprising:

creating a ranging estimate based on said modulation bit sequence and said ranging signal; and transmitting said ranging estimate to said auxiliary system.

46. The method of claim 35 further comprising:

creating a candidate sinusoidal signal based on said ranging signal and a candidate code; and performing spectral analysis on said candidate sinusoidal signal to determine when said candidate code is synchronized with said ranging signal.

\* \* \* \* \*